INVENTOR.
*Spurgeon Sutherland*

United States Patent Office 2,955,474
Patented Oct. 11, 1960

2,955,474

METHOD AND MECHANISMS FOR ALIGNING AN INERTIAL STABILIZED PLATFORM

Spurgeon Sutherland, Arlington, Tex., assignor, by mesne assignments, to the United States of America as represented by the Secretary of the Navy Filed May 3, 1956, Ser. No. 582,577

10 Claims. (Cl. 74—5.34)

This invention relates to a method and an apparatus for azimuth self-aligning an inertial stabilized platform i.e., causing the platform to perform the functions of a gyrocompass, wherein the stabilized platform has three stabilization gyroscopes or gyros of the rate-integrating type with the input axes of said gyroscopes being orthogonal to each other, two of said axes being parallel to the plane of the stabilized platform. In its more restricted aspect, a method and apparatus are disclosed for the additional utilization of the two platform leveling or gyroscope erection torque signals which are applied to the two gyroscopes having input axes parallel to the platform, to derive from said erection torque signals yet a third signal which represents angular departure from a desired azimuth orientation of the stabilized platform. Herebefore in the azimuth alignment of an inertial stabilized platform, the necessity of elaborate optical alignment techniques and equipment and/or of the use of additional gyroscopic sensing units or external references have been required, as shown in Patent 2,591,697. Azimuth self-aligning a stabilized platform is merely causing it to perform the functions of a gyrocompass or by making a self-aligned platform.

Accordingly, a principal object of this invention is to provide an azimuth self alignment feature characteristic to an inertial stabilized platform that requires no external device for generating its self-alignment error signal, but instead, the signal is derived from information which inherently exists in the stabilized platform of the disclosed type having two leveling gyros and an azimuth alignment gyro.

Another object of this invention is to provide for use in a gyrostabilized three-axis gimbal platform, a method for deriving one azimuth torque signal from the other two erection torque signals.

Yet another object of this invention is to provide a three-axis stabilized platform having an azimuth error signal computer which provides for the generation of the azimuth gyroscope torque signal from the other two platform leveling or gyroscope erection torque signals for aligning the platform, i.e., causing rotation of the platform in azimuth to any desired pre-set azimuth setting of a principal platform axis.

A still further object of this invention is to provide an azimuth error signal computer that provides for the generation of the azimuth gyroscope torque signal for a three-axis stabilized platform, that need not be mounted on, nor mechanically connected to, the stabilized platform. Accordingly, a more compact stabilized platform design and construction is permitted over that utilizing the additional gyroscopic and/or optical devices.

Other objects and advantages of the invention will be apparent from the following detailed description, together with the accompanying drawings, submitted for purposes of illustration only and not intended to define the scope of the invention, reference being had for that purpose to the subjoined claims.

Briefly, the disclosed method and apparatus is based on a feature which has been found and proven, that the erection signals for the platform leveling gyroscopes are proportional to the components of the earth's angular velocity vector along the horizontal axes of the platform leveling gyroscopes. Accordingly, I cause the platform to perform the functions of a gyrocompass by deriving the azimuth error signal or angle between the actual platform X-axis ($X_p$) and the desired orientation of the $X_p$ axis, and thus obtain the azimuth gyroscope torque signal, from the erection platform stabilization signals for turning the platform in azimuth until it is gyrocompassed or when the principle platform axis ($X_p$) is orientated to the desired azimuth angle ($\theta_0$). This method of orientation of the platform to any arbitrary azimuth angle obviates the use of additional and elaborate optical alignment equipment, additional gyroscopes, accelerometers, or external references.

For a better understanding of the invention, reference may be had to the following description taken in connection with the accompanying drawings in which.

Figure 1:
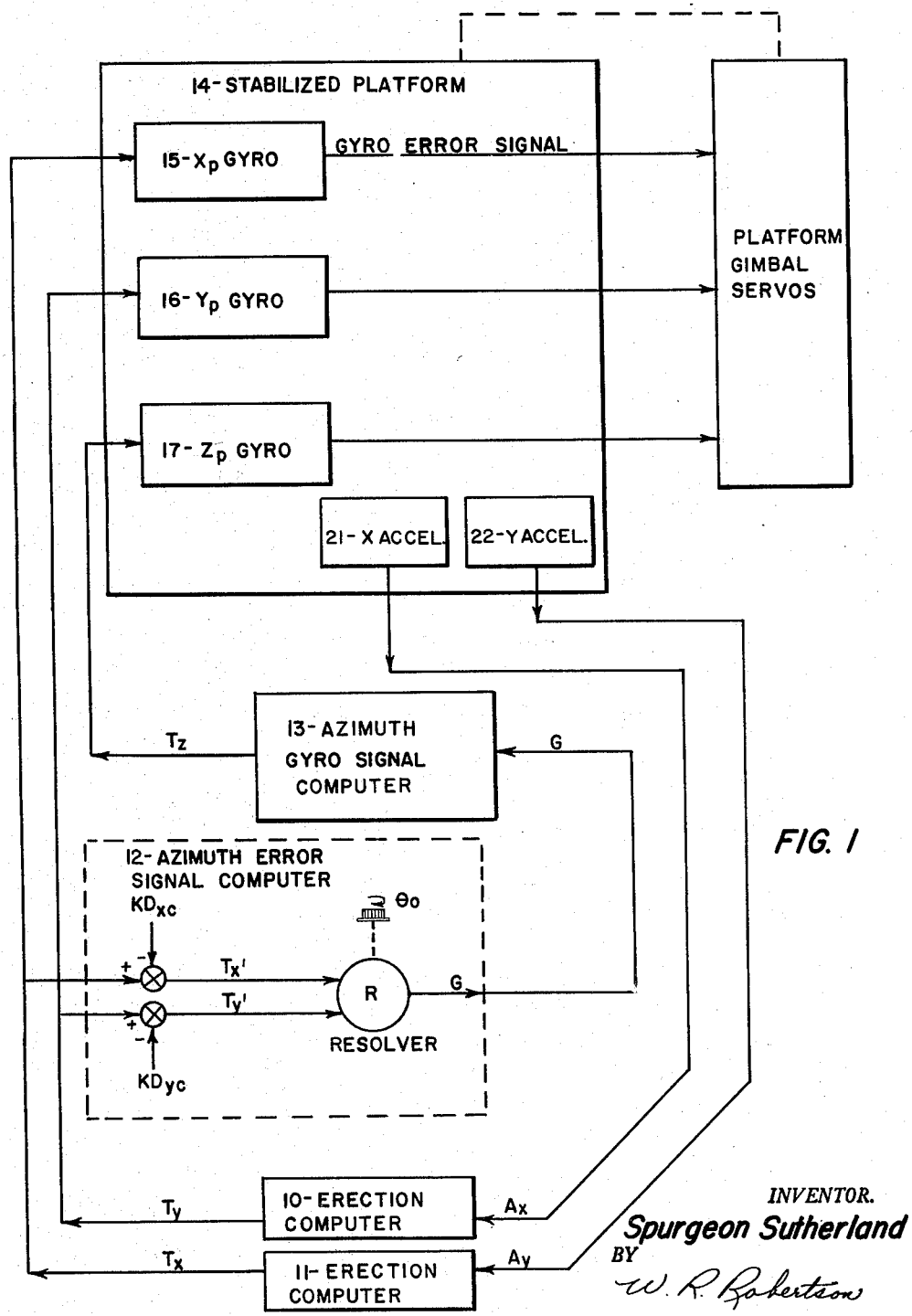
Fig. 1 is a schematic plan view of the azimuth self-aligning system for a gyrostabilized platform including the new azimuth error signal computer.

Fig. 1 discloses an orientation system in which an inertial stabilized platform may be oriented comprising two erection computers 10 and 11, the new azimuth error signal computer 12, a gyro signal computer 13, and an inertial stabilized platform 14 having three rate integrating gyroscopes 15, 16, and 17, gimbal servos or gimbal torque motors 18, 19, 20 (Fig. 3) and accelerometers 21 and 22. Examples of each of the computers are illustrated in detail in Fig. 2. A typical stabilized platform is shown in detail in Fig. 3.

*Inertial stabilized platform*

Figure 3:
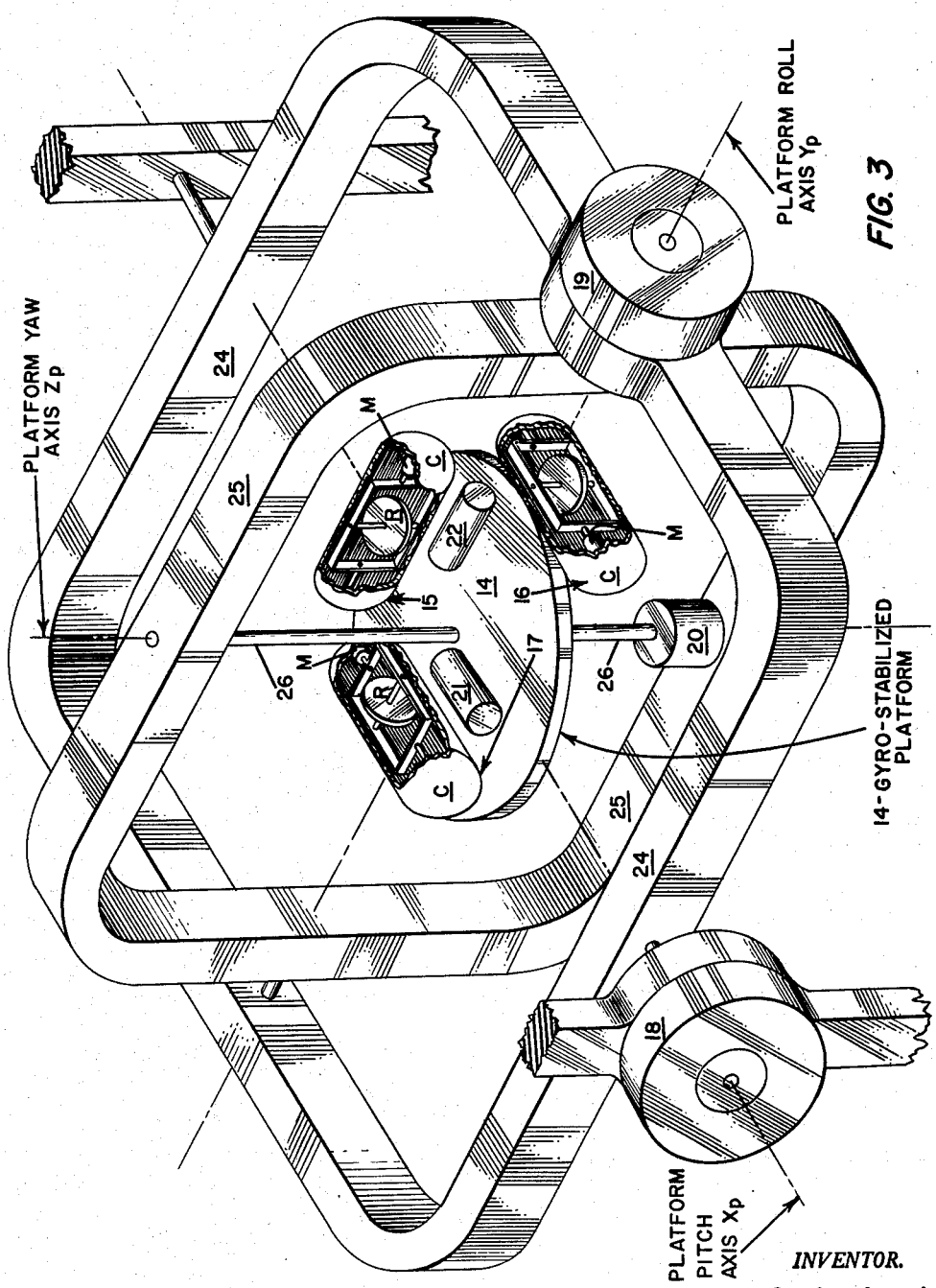
Fig. 3 is a detailed and perspective view of the three-axis gimbal stabilized platform of Fig. 1.

The platform 14, as illustrated in Figs. 1 and 3, is gyrostabilized by the three single-degree-of-freedom rate integrating gyroscopes 15, 16, and 17, each having its sensitive or input axis in alignment with one of the orthogonal platform axes $X_p$, $Y_p$, and $Z_p$, respectively. Accordingly, the X and Y gyroscopes 15, and 16, being sensitive to movements of the platform about its $X_p$ and $Y_p$ axes, respectively, are the platform leveling gyroscopes and the Z gyroscope, 17, being sensitive to platform movements about its $Z_p$ axis, controls the platform azimuth alignment. The axes $X_p$ and $Y_p$ are in the plane of the platform and $Z_p$ is vertical thereto. Like parts are identified with like numbers. Each gyroscope disclosed herein includes a gyroscopic element or gimbal mounted rotor R, a torquer or gyroscope torquing motor M which torques the gimbal mounted rotor in a gyroscope case C about the gyroscope output axis, and an error pickoff (not shown) in the gyroscope case for detecting and measuring any movement of the gyro gimbal about the output or sensitive axis. The platform gimbal rings 24 and 25 and the platform spindle 26 are torqued by motors 18, 19, and 20, respectively. Leveling accelerometers 21 and 22 on the platform to detect the relative angular position between the platform and the horizontal plane provide output signals $A_x$ and $A_y$ to the erection computers disclosed below.

Erection computers

Figure 2:
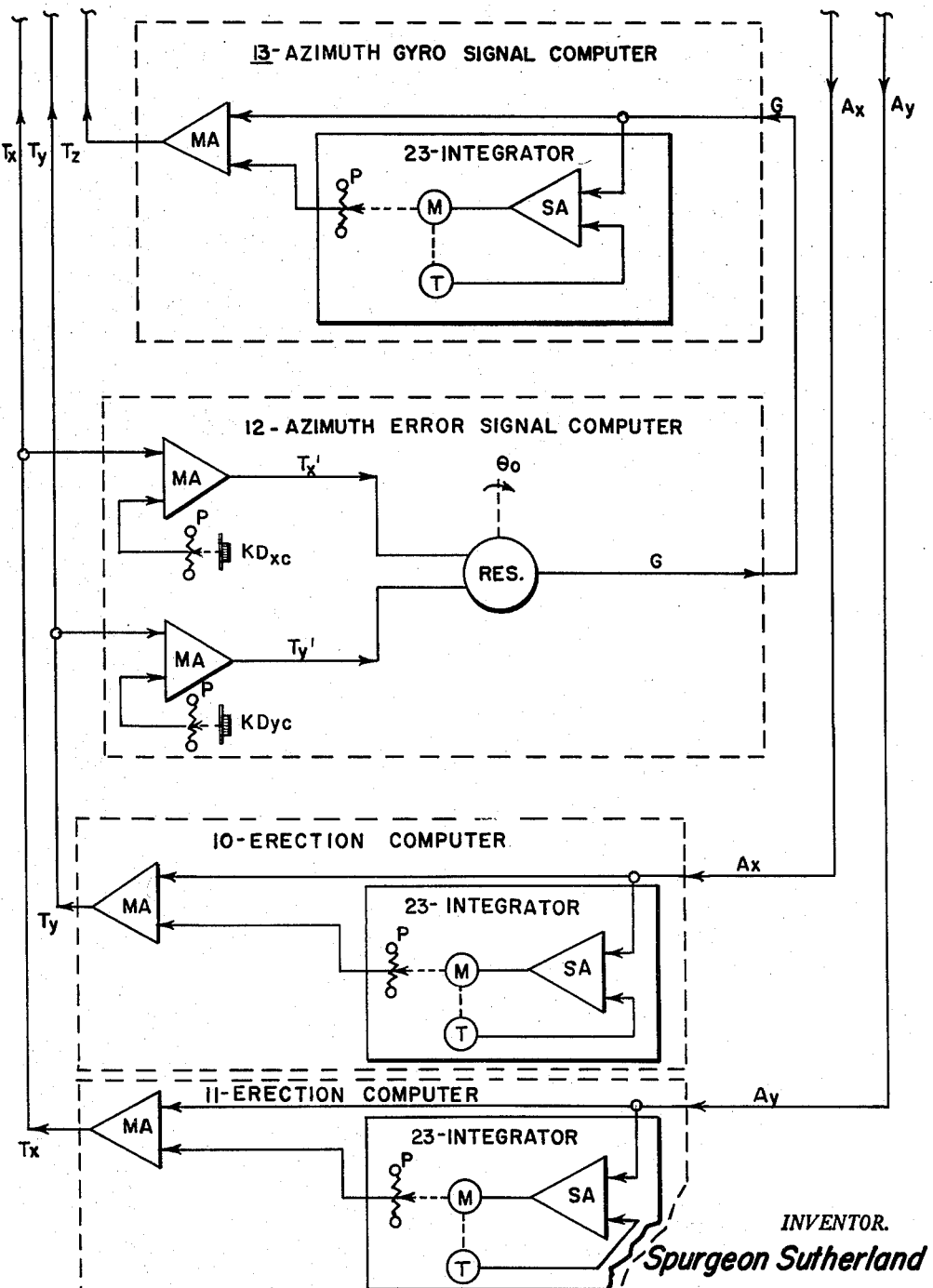
Fig. 2 illustrates, in detail, examples of the erection computer, the azimuth error signal computer, and the azimuth gyro signal computers of Fig. 1.

Each of the erection computers 10 and 11, such as but not limited to those illustrated in Fig. 2, generates the torque signals $T_x$ and $T_y$ which control the torquing motors, M, of the gyroscopes 15 and 16 respectively, which in turn control the platform gimbal servos 18 and 19, respectively, to erect the platform about its $X_p$ and $Y_p$ axes, shown in Fig. 3. The $T_x$ and $T_y$ signals counteract the effects of the earth's angular velocity components on the output signals of the $X_p$ and $Y_p$, or platform leveling, gyroscopes in maintaining the platform perpendicular to a line extending toward the center of the earth. Each of the exemplary erection computers illustrated comprises a suitable motor-tachometer integrator 23 which includes a servo amplifier SA, a motor M, a tachometer T, and a potentiometer P. A suitable summing amplifier MA of erection computer 10 adds the accelerometer output signal $A_x$ to the time integral of the signal $A_x$ from the integrator 23 to provide the gyroscope torquing signal $T_y$. Likewise, erection computer 11 provides the gyroscope torquing signal $T_x$ from the accelerometer output signal $A_y$. Of course when the platform is level, output signals $A_x$ and $A_y$ are zero and then merely the output of the respective integrators provides the gyroscope erection torque signals $T_y$ and $T_x$, respectively. Various means may be utilized for deriving these platform leveling or gyroscope erection torque signals. A preferred method disclosed in Fig. 1 comprises the generation of the torque signals from the outputs of the two leveling accelerometers 21 and 22 on the platform. In this arrangement the erection computers generate the torque signals $T_x$ and $T_y$ to keep the accelerometer outputs $A_x$ and $A_y$ nulled or zeroed and thus maintain the platform level, i.e., when the accelerometer outputs $A_x$ and $A_y$ are nulled or zeroed, the stabilized platform is perpendicular to gravity or normal to the direction of gravitational forces. More specifically, a torque signal $T_x$ applied to gyroscope 15 tends to cause an output error signal, but since the gimbal servo nulls this error signal, the platform rotates about its $X_p$ axis at a rate proportional to the applied torque signal $T_x$, plus any drift rate $D_x$ which may be present in the gyroscope. This drift rate may be determined for each gyroscope.

Azimuth error signal computer and principle of operation

The torque signals $T_x$, $T_y$, and $T_z$ are accordingly proportional to the respective $X_p$, $Y_p$, and $Z_p$ components of the platform angular velocity $\omega_x$, $\omega_y$, and $\omega_z$ in inertial space, plus gyro drift rates, and may be expressed thus:

$$T_x = K(\omega_x + D_x) \quad (1)$$
$$T_y = K(\omega_y + D_y) \quad (2)$$
$$T_z = K(\omega_z + D_z) \quad (3)$$

$K$ = the proportionality constant

For derivation of the azimuth error signal, denoted G, Fig. 1, only the X and Y components of the earth's angular velocity $\omega_e$ need be considered.

Figure 4:
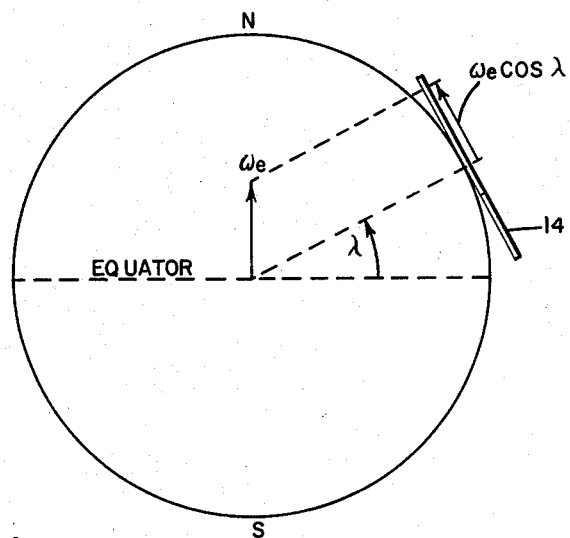
Fig. 4 is a cross-section of the earth with the stabilized platform tangent thereto.
Figure 5:
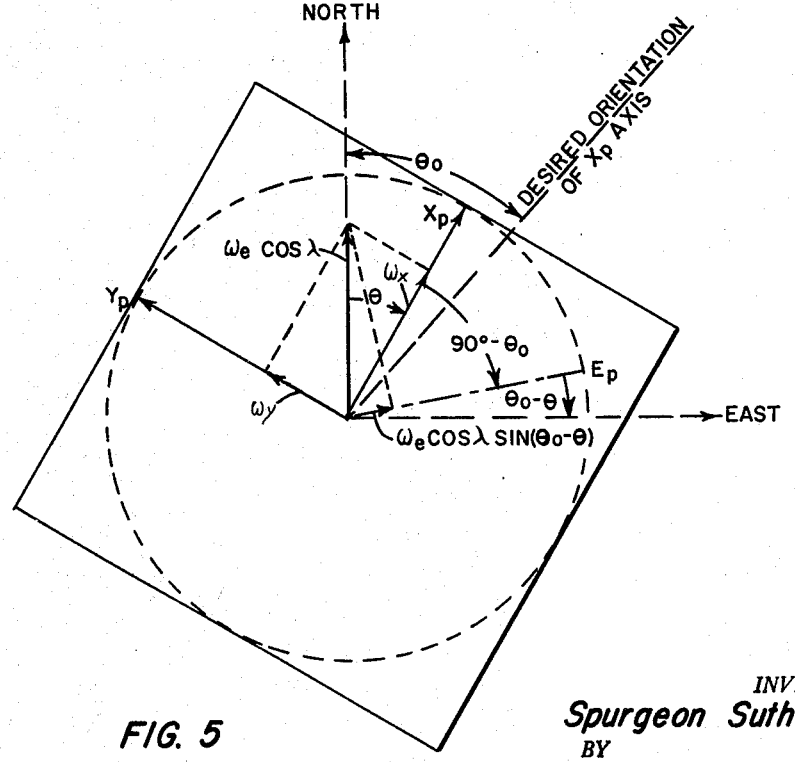
Fig. 5 is an auxiliary inclined view of the platform of Fig. 4 showing vector diagrams thereon.

Figs. 4 and 5 disclose the relationship of the earth's angular velocity to the method and apparatus for azimuth self-aligning the inertial stabilized platform 14. Fig. 4 illustrates a sectional view of the earth through its polar axis N—S with the platform shown parallel to the earth's surface at latitude $\lambda$. The projection of the earth's angular velocity $\omega_e$ in the plane of the platform is accordingly represented by $\omega_e \cos \lambda$.

In Fig. 5, a plan view of the platform 14 of Fig. 4, the azimuth orientation of the platform is defined by the angle $\theta$, measured between north and the platform $X_p$ axis. Fig. 5 shows the angular velocity components $\omega_x$ and $\omega_y$ along the $X_p$ and $Y_p$ axes when the platform is level as:

$$\omega_x = \omega_e \cos \lambda \cos \theta \quad (4)$$
$$\omega_y = \omega_e \cos \lambda \sin \theta \quad (5)$$

$\omega_e$ = the angular velocity of the earth
$\lambda$ = the angle of latitude on the earth Thus Equations 1 and 2 may be written:

$$T_x = K(\omega_e \cos \lambda \cos \theta + D_x) \quad (6)$$
$$T_y = K(\omega_e \cos \lambda \cos \theta + D_y) \quad (7)$$

These erection torque signals, $T_x$ and $T_y$, are used to generate the azimuth error signal G. As shown in Equations 6 and 7, they contain the gyroscope drift rates $D_x$ and $D_y$. There are various methods of calculating and/or experimentally determining the gyroscope drift rates $D_x$ and $D_y$. As shown in Fig. 2, calculated values of these drift rates, $D_{xc}$ and $D_{yc}$, multiplied by the constant K, are subtracted out of the torque signals before they are used in azimuth alignment. The resulting corrected torque signals $T_{x'}$ and $T_{y'}$ are as follows:

$$T_{x'} = T_x - KD_{xc}$$
$$= K[\omega_e \cos \lambda \cos \theta + (D_x - D_{xc})] \quad (8)$$
$$T_{y'} = T_y - KD_{yc}$$
$$= K[\omega_e \cos \lambda \sin \theta + (D_y - D_{yc})] \quad (9)$$

These two corrected torque signals $T_{x'}$ and $T_{y'}$ are proportional to the earth's angular velocity components along the $X_p$ and $Y_p$ axes, subject to the accuracy of the calculated gyroscope drift rates $D_{xc}$ and $D_{yc}$.

A resolver R, Fig. 1 provides for the aligning or orienting of the platform to any arbitrary azimuth angle $\theta_0$, Fig. 5, the number of degrees clockwise that the desired course is from due north. While the resolver R illustrated in Fig. 1 represents an induction-type trigonometric resolver, various other types may be utilized such as precision sine-cosine potentiometers, or precision linear potentiometers, etc., set at the numerical values of sine $\theta_0$ and cosine $\theta_0$. For any given angle $\theta_0$ set into the resolver, the following transformation is performed to provide the azimuth error signal G:

$$G = T_{x'} \sin \theta_0 - T_{y'} \cos \theta_0 \quad (10)$$

This transformation is a projection of the corrected torque signals described above onto the East-Seeking line $E_p$ of the platform illustrated in Fig. 5. This East-Seeking line $E_p$ is established on the platform by the angle $\theta_0$ which is set into the resolver.

Substitution of Equations 8 and 9 into Equation 10 yields:

$$G = K[-\omega_e \cos \lambda \sin (\theta - \theta_0) + D_E] \quad (11)$$

$D_E$ = projection of the gyroscope drift uncertainties on the East-Seeking line $E_p$.

$$D_E = (D_x - D_{xc}) \sin \theta_0 - (D_y - D_{yc}) \cos \theta_0 \quad (12)$$

Equation 11 shows that the azimuth error signal G is proportional to the projection of the earth's angular velocity $\omega_e$ onto the East-Seeking line $E_p$ of the platform, illustrated in Fig. 5, subject only to the gyroscope drift uncertainty $D_E$ defined in Equation 12.

Azimuth gyro signal computer

The azimuth gyro signal computer 13 of Fig. 1 receives the azimuth error signal G, applies suitable operations to obtain the desired transient response characteristics of the system, and generates the azimuth gyroscope torque signal $T_z$. More specifically and as seen from Fig. 2, the azimuth gyro signal computer's summing amplifier MA adds the azimuth error signal G to the time integral of G from the computer's integrator 23, similar to the erection computer's integrator, to provide the azimuth gyroscope torque signal $T_z$. The signal $T_z$ causes the platform 14 to rotate in azimuth, thereby changing $T_{x'}$ and $T_{y'}$, to null or zero the azimuth error signal G. Then when the azimuth error signal G is nulled, the earth rate component $\omega_e \cos \lambda \sin (\theta_0 - \theta)$ is equal in magnitude but opposite in sign to the gyro drift uncertainty $D_E$ defined in Equation 12. In Fig. 5 the drift rate uncertainty $D_E$ is not shown, such as, for example if $D_E$ were zero. Therefore in this case where $D_E$ is zero, the earth rate component $\omega_e \cos \lambda \sin (\theta_0 - \theta)$ along the $E_p$ axis would likewise go to zero. Then when $G=0$, the azimuth alignment error is, from Equation 10:

$$\theta - \theta_0 = \frac{D_E}{\omega_e \cos \lambda} \quad (13)$$

Gyroscopes of the type considered here are currently being built which have drift rate uncertainties of 0.008 degree/hour. From Equation 13, for example, this drift rate uncertainty would cause an azimuth error of 1.8 minutes of an arc at the equator or 2.6 minutes at 45 degrees latitude. In gyroscopes with smaller drift rate uncertainties, the azimuth alignment error would be proportionally smaller.

Modification

Figure 6:
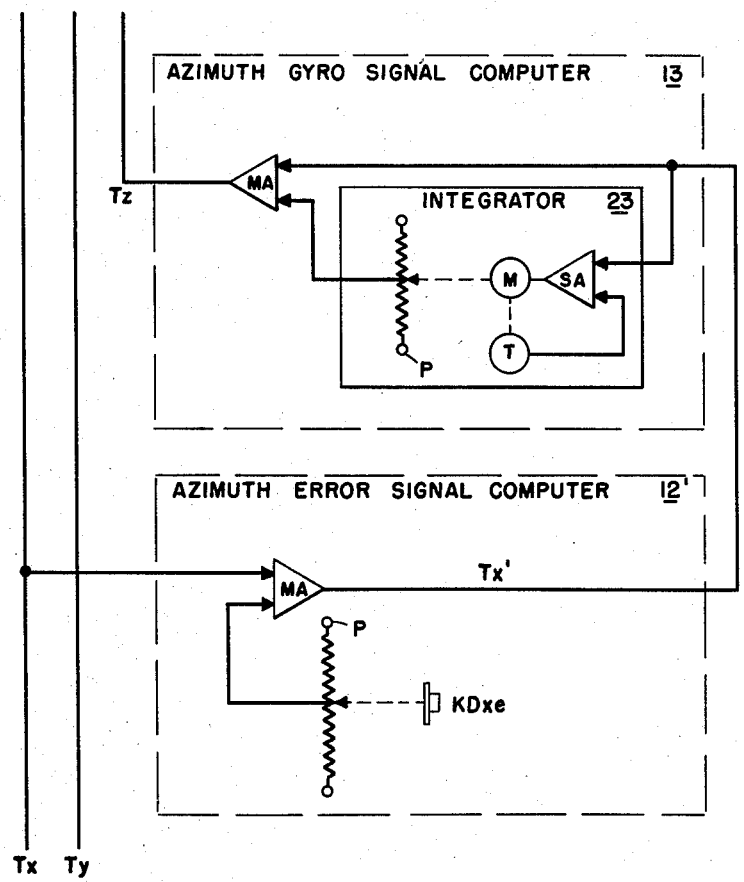
Fig. 6 is a modification of the illustration shown in Fig. 2.

In some inertial systems, arbitrary platform orientation is not required. In those cases where the platform axis $X_p$ or $Y_p$ is desired to be aligned to one of the cardinal points of the compass, i.e., either north, east, south, or west, the resolver R in the azimuth error signal computer may be dispensed with in the embodiment disclosed in Fig. 2, and the computer so adjusted that the corrected torque signals $\pm T_{x'}$ or $\pm T_{y'}$ can be fed directly to the azimuth gyro signal computer 13, as shown in Fig. 6, to cause the platform to orient itself toward one of the four cardinal points of direction, north, east, south, and west. For example, to construct the computer 12 to cause the platform to orient itself to the east, $T_x$ amplifier, MA, is adjusted to provide a positive voltage output signal $T_{x'}$ which is fed directly to the azimuth gyro signal computer 13. For alignment to the west, a negative voltage is required. For alignment to the north or south, the voltage outputs $T_{y'}$ would be varied similarly.

Summary

In summarizing, a new mechanism utilizing a new method for aligning an inertial stabilized platform or for causing an inertial stabilized platform to perform the functions of a gyrocompass by maintaining a predetermined azimuth orientation has been disclosed. In the preferred embodiment the two platform gyroscopic torque stabilization signals ($T_x$, $T_y$) are utilized to derive the platform third or azimuth gyroscope torque signal for maintaining the platform aligned with the desired orientation or heading. This mechanism or computer, after subtracting out the gyroscope drift rates ($KD_{xc}$, $KD_{yc}$) feeds the corrected torque signals ($T_{x'}$, $T_{y'}$) through a resolver to derive and yield the azimuth error signal G which is, in turn, fed through the azimuth gyro signal computer to provide the azimuth gyroscope torque signal ($T_z$) for turning the platform in azimuth until the principal platform axis is oriented to the desired azimuth angle ($\theta_0$). Thus a desired or predetermined azimuth angle may be set into the resolver and it will be maintained by the gyro system on the basis of error signals derived from information already existing in the three-axis inertial stabilized platform utilizing two leveling gyros and an azimuth alignment gyro, thereby obviating the need for additional sensing units especially provided solely for this purpose. Accordingly, this mechanism and method of orientation of the inertial stabilized platform to any arbitrary or desired azimuth angle obviates the use of additional gyroscopes, elaborate optical alignment equipment, or other external references. Further, the resolver may be cut out if the platform is desired to be aligned with north, east, south, or west.

It will be obvious to those skilled in the art that various changes may be made in the disclosed method and mechanism for causing an inertial stabilized platform to perform the functions of a gyrocompass without departing from the spirit and scope thereof and therefore the invention is not limited by that which is shown in the drawing and described in the specification, but only as indicated in the appended claims.

I claim:

1. An azimuth self-aligned inertial stabilized platform comprising, a platform gyrostabilized about its three orthogonal platform axes by two leveling gyroscope means and an azimuth alignment gyroscope means, two leveling accelerometer means for said platform responsive to movement of the platform from the horizontal plane for generating output signals, two erection computer means responsive to said output signals for generating two platform leveling gyroscope torque signals for maintaining said platform level, an azimuth error signal computer means adjustable for having any desired azimuth angle set therein, said azimuth error signal computer being responsive to said two platform leveling gyroscope torque signals for generating azimuth error signals, and an azimuth gyro signal computer means for generating azimuth gyroscope torque signals from said azimuth error signals for causing the platform to rotate in azimuth until in coincidence with said desired azimuth angle.

2. An azimuth self-aligned platform comprising, a platform gyrostabilized about its three orthogonal platform axes by two leveling gyroscope means and an azimuth alignment gyroscope means, two leveling accelerometer means for said platform responsive to relative movement of the platform from the horizontal plane for generating output signals, two erection computer means responsive to said output signals for generating two platform gyroscope erection torque signals for maintaining said platform level, an error signal computer means adjustable for having a desired azimuth angle set therein and responsive to at least one of said two platform gyroscope erection torque signals for generating azimuth error signals for causing the platform to rotate in azimuth until in coincidence with said desired azimuth angle.

3. An azimuth self-aligned platform comprising, a platform gyrostabilized about its pitch, roll, and yaw axes by pitch, roll, and yaw gyroscope means, respectively, two accelerometer means for said platform responsive to relative movement between the platform and the horizontal plane for generating output signals, pitch and roll erection computer means responsive to said output signals for generating pitch and roll gyroscope torque signals, respectively, an azimuth error signal computer means adjustable to one of the directions north, east, south, and west and responsive to said pitch gyroscope torque signals for generating azimuth error signals, and an azimuth gyro signal computer means for generating azimuth gyroscope torque signals from said azimuth error signals for causing the platform to rotate in azimuth until in coincidence with said one direction.

4. An azimuth self-aligned platform comprising, a platform gyrostabilized about its pitch, roll, and yaw axes, by pitch, roll, yaw gyroscope means, respectively, two accelerometer means for said platform responsive to relative movement between the platform and the horizontal plane for generating output signals, pitch and roll erection computer means responsive to said output signals for generating pitch and roll gyroscope torque signals, respectively, the invention comprising an azimuth error signal computer means adjustable to one of the cardinal points of the compass and responsive to said roll gyroscope torque signals for generating azimuth error signals, and an azimuth gyro signal, computer means for generating azimuth gyroscope torque signals from said azimuth error signals for causing the platform to rotate in azimuth until in coincidence with said one cardinal point.

5. In an inertial stabilized platform system comprising first and second leveling gyroscopes and an azimuth alignment gyroscope mounted on a platform, each gyroscope having its sensitive axis in alignment with one of the three orthogonal platform axes and responsive to platform movement about its sensitive axis, first and second leveling accelerometers on said platform responsive to relative movement between the platform and the horizontal plane for generating output signals, first and second erection computers respectively connected between said first and second accelerometers and said first and second leveling gyroscopes, said first and second erection computers respectively being responsive to the output signals of said first and second accelerometers for generating two platform gyroscope erection torque signals for maintaining the platform level, and an azimuth gyro signal computer connected to the platform and responsive to azimuth error signals for generating azimuth gyroscope torque signals, the invention comprising an azimuth error signal computer means for the gyrostabilized platform adjustable for having any desired azimuth angle set therein, said azimuth signal computer means being responsive to the drift rates of each of said first and second leveling gyroscopes and to their respective platform gyroscope erection torque signals for generating the azimuth error signals to cause the platform to rotate in azimuth until in coincidence with said desired azimuth angle.

6. In a self-aligning system for an inertial stabilized platform comprising three gyroscope means on said platform, each gyroscope means having its sensitive axis in alignment with one of the three orthogonal platform axes and responsive to platform movement about its sensitive axis, two leveling accelerometer means responsive to the relative angular position between the platform and the horizontal plane for generating output signals, two erection computer means responsive to the output signals of the two accelerometer means for generating two platform gyroscope erection torque signals for maintaining the platform level, and an azimuth gyro signal computer means responsive to azimuth error signals for generating azimuth gyroscope torque signals, the invention comprising an azimuth error signal computer means comprising, two summing amplifier means for adding the drift rates of each of said two leveling gyroscope means to their respective erection torque signals for generating two corrected erection torque signals, and a resolver means adjustable for having any desired azimuth angle set therein, said resolver means responsive to said two corrected erection torque signals for generating azimuth error signals to cause the platform to rotate in azimuth until in coincidence with said desired azimuth angle.

7. In a self-aligning system for a gyrostabilized platform comprising three gyroscope means on the platform wherein the platform is continuously maintained level by two of the gyroscope means and oriented in azimuth by the third gyroscope means, the two platform leveling gyroscope means being responsive to gyroscope erection torque signals from two erection computer means, and an azimuth gyro signal computer means responsive to azimuth error signals for generating azimuth gyroscope torque signals, the invention comprising an azimuth error signal computer means for the gyrostabilized platform comprising, two summing amplifier means for subtracting the drift rates of each of said leveling gyroscope means out of their respective erection torque signals for generating corrected erection torque signals, and a resolver means being adjustable for having any desired azimuth angle set therein, said resolver means responsive to said corrected erection torque signals for generating azimuth error signals for generation of said azimuth gyroscope torque signals to cause the platform to rotate in azimuth to said desired azimuth angle.

8. In a self-aligning system for an inertial stabilized platform wherein the platform is adapted to be continuously maintained level with two gyroscope means responsive to continuous platform gyroscope erection torque signals and wherein the platform is rotated in azimuth by a third gyroscope means responsive to azimuth gyroscope torque signals, the invention comprising an azimuth error signal computer means for the inertial stabilized platform comprising, two summing means for subtracting the drift rates of each of said leveling gyroscope means out of their respective erection torque signals for generating corrected erection torque signals, and a resolver means being adjustable for having any desired azimuth angle set therein, said resolver means responsive to said corrected erection torque signals for generating azimuth error signals for generation of said azimuth gyroscope torque signals to cause the platform to rotate in azimuth to said desired azimuth angle.

9. An azimuth self-aligned platform having in combination, an azimuth alignment gyroscope means responsive to azimuth gyroscope torque signals for orienting the platform to any desired azimuth angle and for continuously maintaining the desired azimuth angle, two leveling gyroscope means responsive to two gyroscope erection torque signals for maintaining the platform level, and means for generating the azimuth gyroscope torque signals from the aforementioned elements in the following sequence: subtracting the drift rates of each of said leveling gyroscope means out of their respective erection torque signals for generating corrected erection torque signals, generating azimuth error signals from said corrected erection torque signals, and generating the azimuth gyroscope torque signals from said azimuth error signals for aligning the platform.

10. An azimuth self-aligned platform having in combination, an azimuth alignment gyroscope means responsive to an azimuth gyroscope torque signal for orienting the platform to any desired azimuth angle and for continuously maintaining the desired azimuth angle, two leveling gyroscope means responsive to two gyroscope erection torque signals for maintaining the platform level, and means for generating the azimuth gyroscope torque signals from the aforementioned elements in the following sequence: subtracting the drift rates of each of said leveling gyroscope means out of their respective erection torque signals for generating corrected erection torque signals, generating azimuth error signals proportional to the projection of the earth's angular velocity onto the east-seeking line of the platform, and generating the azimuth gyroscope torque signal from said azimuth error signals for aligning said platform with the predetermined azimuth orientation.

References Cited in the file of this patent

UNITED STATES PATENTS

| | | |
|---|---|---|
| 2,591,697 | Hays | Apr. 8, 1952 |
| 2,752,792 | Draper et al. | July 3, 1956 |
| 2,835,131 | Vacquier et al. | May 20, 1958 |